(12) United States Patent
Voronkov et al.

(10) Patent No.: US 10,469,611 B2
(45) Date of Patent: Nov. 5, 2019

(54) REDUCED PAGE LOAD TIME UTILIZING CACHE STORAGE

(71) Applicant: Microsoft Technology Licensing, LLC, Redmond, WA (US)

(72) Inventors: Nikita Voronkov, Bothell, WA (US); Ryan Nakhoul, Issaquah, WA (US); Dmitriy Meyerzon, Bellevue, WA (US); Naresh Kannan, Seattle, WA (US); David M. Cohen, Duvall, WA (US); Negin Arhami, Bellevue, WA (US); Aninda Ray, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 15/186,323

(22) Filed: Jun. 17, 2016

(65) Prior Publication Data

US 2017/0324829 A1   Nov. 9, 2017

Related U.S. Application Data

(60) Provisional application No. 62/331,336, filed on May 3, 2016.

(51) Int. Cl.
*G06F 3/048* (2013.01)
*H04L 29/08* (2006.01)
(Continued)

(52) U.S. Cl.
CPC ........ *H04L 67/2847* (2013.01); *G06F 3/0482* (2013.01); *G06F 3/067* (2013.01);
(Continued)

(58) Field of Classification Search
None
See application file for complete search history.

(56) References Cited

U.S. PATENT DOCUMENTS 7,096,418 B1   8/2006 Singhal et al.
7,421,481 B2   9/2008 Dzierzon et al.
(Continued)

FOREIGN PATENT DOCUMENTS

EP       1107533 A2    6/2001
WO    WO2014134234    9/2014
WO    WO2015020853    2/2015

OTHER PUBLICATIONS

Shanping, et al., "A collaborative performance tuning approach for Portal-based web sites", In Sixth International Conference on Networked Computing and Advanced Information Management, Aug. 16, 2010, pp. 113-117.

(Continued)

*Primary Examiner* — William C Trapanese
(74) *Attorney, Agent, or Firm* — Schwegman Lundberg & Woessner, P.A.

(57) ABSTRACT

A cache that can be stored in a user partitioned region of storage and utilized to reduce the amount of time required to present content responsive to content requests is described. A request for content associated with a region of a user interface can be received and data corresponding to a list item in a cache can be accessed. Content associated with the data can be presented in the region of the user interface via a same presentation as a most recent presentation of the content. At a time subsequent to when the content is initially presented in the region, new data associated with the list item can be retrieved. In examples where the new data corresponds to updated data, the presentation can be modified based partly on the updated data and the new data can be written to the cache in a location corresponding to the list item.

20 Claims, 6 Drawing Sheets

(51) Int. Cl.
*G06F 3/0482* (2013.01)
*G06F 3/06* (2006.01)
*G06F 12/0873* (2016.01)
*G06F 12/0875* (2016.01)
*G06F 16/957* (2019.01)

(52) U.S. Cl.
CPC .......... *G06F 3/0611* (2013.01); *G06F 3/0644* (2013.01); *G06F 3/0659* (2013.01); *G06F 12/0873* (2013.01); *G06F 12/0875* (2013.01); *G06F 16/9574* (2019.01); *G06F 2203/04803* (2013.01); *G06F 2212/1024* (2013.01); *G06F 2212/154* (2013.01); *G06F 2212/163* (2013.01); *G06F 2212/264* (2013.01); *G06F 2212/314* (2013.01)

(56) References Cited

U.S. PATENT DOCUMENTS

| | | | |
|---|---|---|---|
| 8,812,451 | B2 | 8/2014 | Shukla et al. |
| 9,065,793 | B2 | 6/2015 | Gleadall et al. |
| 9,077,681 | B2* | 7/2015 | Mickens ........... G06F 17/30902 |
| 2003/0120752 | A1 | 6/2003 | Corcoran |
| 2005/0050085 | A1 | 3/2005 | Shimada et al. |
| 2011/0055683 | A1 | 3/2011 | Jiang |
| 2013/0204857 | A1 | 8/2013 | Kartoun |
| 2014/0095645 | A1 | 4/2014 | Grosz et al. |
| 2014/0172800 | A1* | 6/2014 | Clark ....................... G06F 8/71 707/638 |
| 2014/0337484 | A1 | 11/2014 | Kasten et al. |
| 2014/0379841 | A1 | 12/2014 | Zong et al. |
| 2015/0088970 | A1* | 3/2015 | Wei ......................... H04L 67/10 709/203 |
| 2016/0004410 | A1* | 1/2016 | Srinivasan ............. G06Q 50/01 715/765 |

OTHER PUBLICATIONS

"Navigation Caching", Retrieved on: May 2, 2016, Available at: https://help.sap.com/saphelp_nw73/helpdata/en/49/3e74ed28ab2222e10000000a42189d/content.htm 4 pages.

"Understanding Portal Caching", Published on: Jun. 21, 2015, Available at: https://docs.oracle.com/cd/E55243_01/pt854pbr0/eng/pt/tprt/concept_UnderstandingPortalCaching-c072da.html#topofpage 2 pages.

"Caching Portions of an asp.net page", Retrieved from<<https://msdn.microsoft.com/en-us/library/h30h475z.aspx>>, Published on: Jun. 7, 2014, 3 Pages.

Archibald, Jake, "The Offline Cookbook", Retrieved from<<https://jakearchibald.com/2014/offline-cookbook/>>, Dec. 9, 2014, 25 Pages.

"International Search Report and Written Opinion Issued in PCT Application No. PCT/US2017/029731", dated Aug. 8, 2017, 24 Pages.

Smith, et al., "asp.net Caching: Techniques and Best Practices", Retrieved from<<https://msdn.microsoft.com/en-us/library/aa478965.aspx>>, Aug. 2003, 11 Pages.

Ward, Dave, "Display Data Updates in Real-Time with AJAX I Encosia", Retrieved from<<https://web.archive.org/web/20160317012529/http://encosia.com/display-data-updates-in-real-time-with-ajax/>>, Oct. 15, 2008, 12 Pages.

* cited by examiner

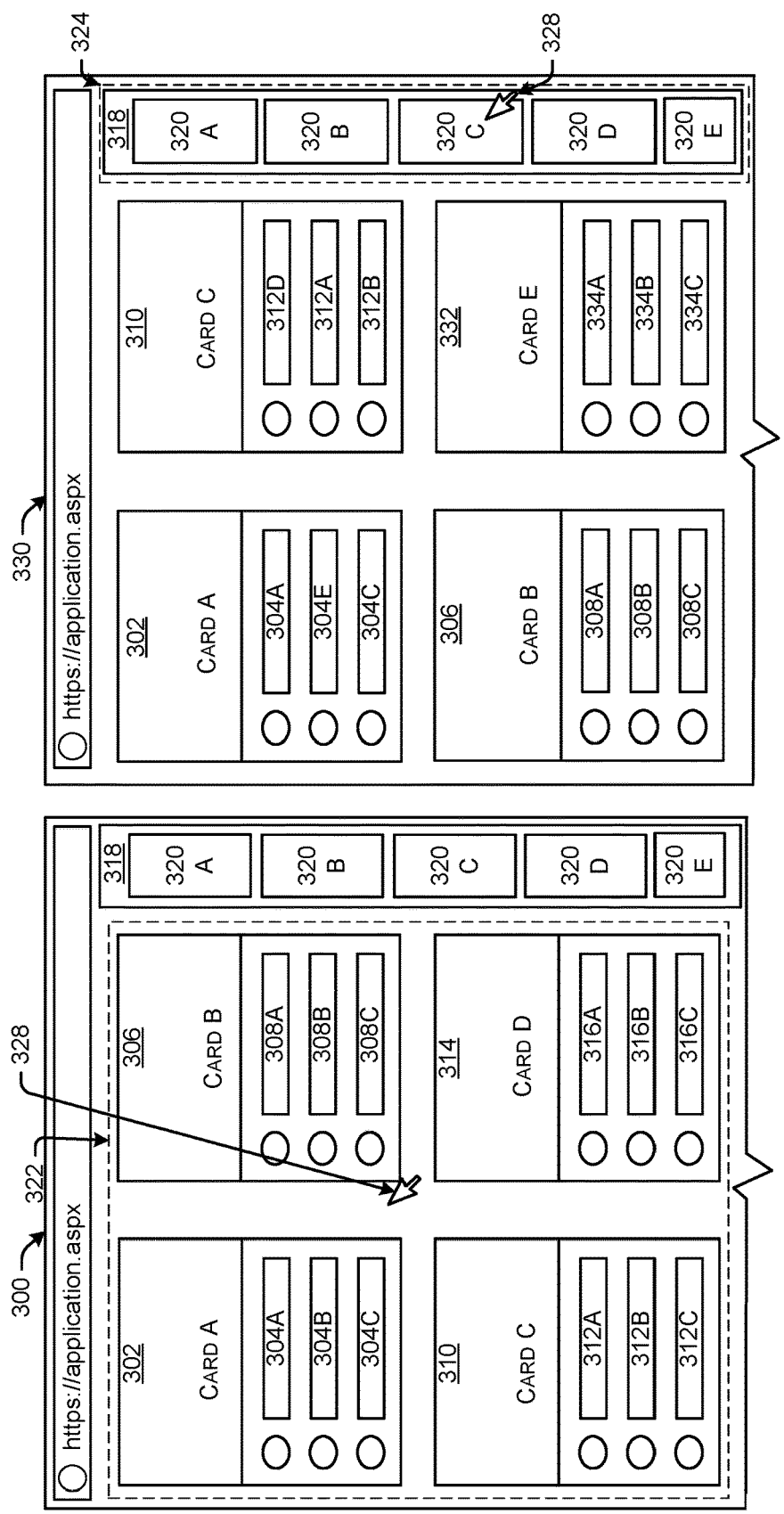

REDUCED PAGE LOAD TIME UTILIZING CACHE STORAGE

RELATED APPLICATION

This application claims the benefit of U.S. Provisional Application No. 62/331,336 filed on May 3, 2016, the entire contents of which are incorporated herein by reference.

BACKGROUND

Fetching data can be time consuming and computationally intensive. For instance, in a web-based application that is based on a search system, queries might be complex and expensive to run. That is, requests for data can require multiple queries and subsequent processing of results returned responsive to the queries. Executing multiple queries and subsequently processing the results can require time and computing resources. As a result, fetching data can be associated with a significant lag time. From a user perspective, in some examples, the lag time can translate to a page load time. That is, the page load time—the time required for content to show up in a user interface associated with a browser, for example—is dependent on the amount of time required to fetch data. Because of the time required to perform multiple queries and subsequently process results returned responsive to the queries, the time required to fetch data responsive to a request for data can amount to wasted time and user frustration.

SUMMARY

This disclosure describes a cache that can be stored in a user partitioned region of storage and utilized to reduce the amount of time required to present content responsive to content requests. A request for content associated with a region of a user interface can be received and data corresponding to a list item in a cache that can be stored in a user partitioned region of storage can be accessed. Content associated with the data can be presented in the region of the user interface via a same presentation as a most recent presentation of the content. At a time subsequent to when the content is initially presented in the region, new data associated with the list item can be retrieved. That is, at a time subsequent to when the content is initially presented, new data corresponding to the request for content can be retrieved. In examples where the new data corresponds to updated data, the presentation can be modified based partly on the updated data and the new data can be written to the cache in a location corresponding to the list item.

As described herein, writing data corresponding to most recently presented content to a cache, which can be stored in a user partitioned region of storage, can reduce the amount of time required to populate a user interface with content upon receiving a subsequent request for content associated with a user interface. That is, in at least one example, the techniques described herein can reduce the page loading time associated with presenting content via a user interface. As a result, techniques described herein can enable improved user efficiency and increased user interaction performance with the user interface.

Furthermore, various optimizations described herein can minimize the amount of data that is written to the cache, thereby conserving computing resources. For instance, techniques described herein can conserve computing resources by minimizing writes to the cache when the newly fetched data is not updated data and avoiding unnecessary writes to the cache when data does not change.

Additionally, this disclosure describes a cache that can be stored in a partitioned region of storage. In at least one example, the partitioned region of the storage can be a user partitioned region of the storage, so that the particular storage partition is a function of a user that is exclusively accessible to that user. In at least one example, storing caches in user partitioned regions of the storage can reduce concurrent loads and/or alleviate contention caused by concurrent requests for content. Additionally and/or alternatively, caches stored in user partitioned regions of the storage can provide additional security measures by limiting information disclosure outside of a user partitioned region.

It should be appreciated that the above-described subject matter can be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of techniques in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 3B is a schematic diagram showing the user interface of FIG. 3A with an indication of user interaction with a region of the user interface.

FIG. 3C is a schematic diagram showing modifications to the user interface of FIG. 3A.

DETAILED DESCRIPTION

Figure 1:
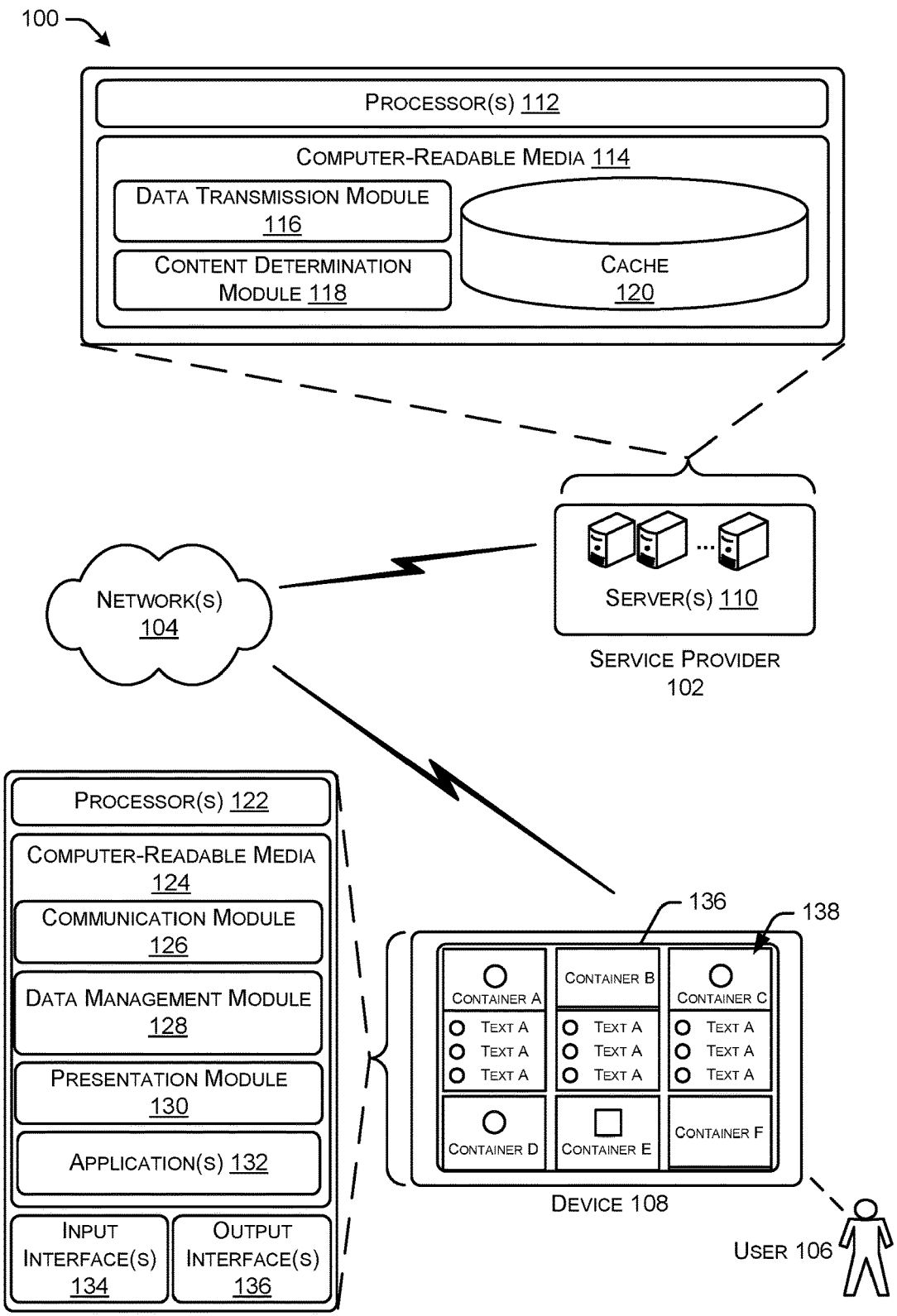
FIG. 1 is a schematic diagram showing an example environment for leveraging a cache to reduce the amount of time required to present content responsive to a request for the content.

This disclosure describes utilizing cache storage (i.e., a cache) to reduce the amount of time required to present content responsive to content requests. Upon receiving a request for content associated with a user interface, techniques described herein can populate the user interface with content corresponding to data stored in a cache (i.e., cached data) and can asynchronously fetch new data from multiple sources (e.g., devices, service providers, applications, etc.) while the content corresponding to the cached data is presented via the user interface. As described herein, by asynchronously fetching new data, the techniques can enable the cached data to be presented via the user interface without waiting until newly fetched data is written to the cache. That is, the newly fetched data can be written to the cache opportunistically, and if writing newly fetched data to the cache fails, the user may not know because previously cached data can be presented via the user interface.

Based at least in part on fetching the new data, techniques described herein can transition content presented via the user interface to represent changes to the cached data that occurred after the data was written to the cache, as indicated by the new data. That is, techniques described herein can update content presented via the user interface based at least in part on the new data. Additionally, in at least one example, the new data can be written to the cache so that when a user subsequently requests access to the content, the techniques described herein can access the cached data, which can include the new data, and can present the content corresponding to the cached data without needing to wait for a system to fetch data to populate the user interface. As a result, techniques described herein can reduce page loading time associated with content requests.

As described herein, writing data corresponding to most recently presented content to a cache can reduce the amount of time required to populate a user interface with content upon receiving a subsequent request for content associated with a user interface. That is, in at least one example, the techniques described herein can reduce the page loading time associated with presenting content via a user interface. As a result, techniques described herein can enable improved user efficiency and increased user interaction performance with the user interface.

Additionally, various optimizations described herein can minimize the amount of data that is written to the cache, thereby conserving computing resources. For instance, in at least one example, data returned responsive to requests for new data can be written to the cache without including additional data that is not related to the returned data. As such, the amount of data written to the cache can be minimized. Additionally and/or alternatively, in some examples, newly fetched data does not correspond to updated data. That is, the newly fetched data does not represent a change to the previously cached data. In such examples, techniques described herein can refrain from writing the newly fetched data to the cache. As a result, techniques described herein can conserve computing resources by minimizing writes to the cache when the newly fetched data is not updated data and avoiding unnecessary writes to the cache when data does not change.

Furthermore, a cache can be stored in a partitioned region of storage associated with a service provider. In at least one example, the partitioned region of the storage can be a user partitioned region of the storage, so that the particular storage partition is a function of a user that is exclusively accessible to that user. In at least one example, storing caches in user partitioned regions of the storage can reduce concurrent loads and/or alleviate contention caused by concurrent requests for content. Additionally and/or alternatively, caches that can be stored in user partitioned regions of the storage can provide additional security measures by limiting information disclosure outside of a particular user partitioned region. As described herein, in at least one example, the cache can store data corresponding to content that was most recently presented via a user interface associated with a device corresponding to a user in a user partitioned region of the storage. In at least one example, the user interface can be associated with personalized security trimmed data that can be computationally expensive to retrieve. Because the data is stored in a user partitioned region of the storage, other users cannot access the data. As such, storing caches in user partitioned regions of the storage can reduce the need for additional security and/or permissions filtering that can be required for globally cached data. As a result, techniques described herein can increase security and/or reduce processing costs associated with enforcing security and/or permissions.

As a non-limiting example, a user can request access to a browser associated with a web-based application. For instance, a user can request to open a browser (e.g., web browser, mobile browser, etc.) associated with a web-based application, request to refresh the browser, or request to open a second browser associated with the web-based application. In the non-limiting example, the browser can correspond to a portal, or a home page, providing access to other objects. For the purpose of this discussion, objects can include, but are not limited to, team sites, publishing sites, group sites, blogging sites, video channels, image channels, data streaming channels, folders, applications, documents, wikis, blog posts, web pages, videos, images, information items, data streams, etc. In at least one example, the objects can be associated with multiple sources (e.g., devices, service providers, applications, etc.) that can be associated with multiple users. In such examples, fetching data associated with the multiple sources and/or users (i.e., determining which objects to promote via the user interface associated with the browser) can be computationally expensive, often requiring several seconds to obtain. Furthermore, additional security and/or permissions filtering of data associated with the multiple sources and/or users (i.e., determining which objects cannot be promoted via a user interface associated with the browser due to security and/or permissions) can also be computationally expensive.

A user interface associated with the browser can have multiple regions that are each populated with content based on separate requests for content. Each request for content can necessitate one or more computations to determine data corresponding to the content to populate the corresponding region in the user interface. An example of a computation can be accessing aggregated data associated with the multiple sources and traversing a data structure associated with the aggregated data to determine the data corresponding to the content for the region. In at least one example, data associated with a response to a request for the content can be written to a particular location in the cache corresponding to a region associated with the request. As described above, in at least one example, the cache can be associated with a user partitioned region of storage associated with a service provider.

In the non-limiting example above, a first region of the user interface associated with the browser can be populated with content determined based at least in part on a request for objects recently and/or regularly accessed by the user. In the non-limiting example, the first region can correspond to an object feed. In such an example, the first region can be associated with a plurality of cards and each card can correspond to a different object. For instance, a first card can correspond to a team site, a second card can correspond to a blogging site, a third card can correspond to a video channel, etc. In some examples, the cards can be ordered based on relevance to a user. In order to determine the objects corresponding to each of the cards and the order, techniques described herein can send a request for data associated with an object feed. Techniques described herein can initiate a particular set of computations to determine the objects to include in the object feed and an order for the objects. The result of such computations can be written to the cache for subsequent recall in a location specific to the first region.

Additionally, in the non-limiting example, a second region of the user interface can be populated with content determined based at least in part on a request for objects to recommend to the user. In the non-limiting example, the second region can correspond to recommended objects. In such an example, the second region can be associated with a plurality of hyperlinks and each hyperlink can correspond to a different object. For instance, a first hyperlink can correspond to a group site, a second hyperlink can correspond to a publishing site, a third hyperlink can correspond to a video channel, etc. In some examples, the hyperlinks can be ordered based on relevance to a user. In order to determine the objects corresponding to each of the hyperlinks and the order, techniques described herein can send a request for data associated with recommended objects. Techniques described herein can initiate a particular set of computations to determine the objects and an order for the objects. The result of such computations can be written to the cache for subsequent recall in a location specific to the second region.

When a user requests access to the browser associated with the web-application, the techniques described herein can access cached data and can populate each region of the user interface associated with the browser with content based on the cached data stored in the location corresponding to each region. That is, in the non-limiting example, the first region of the user interface can be populated with content corresponding to the data stored in the location of the cache corresponding to the first region and the second region of the user interface can be populated with content corresponding to the data stored in the location of the cache corresponding to the second region. Then, the techniques described herein can asynchronously send requests for new data associated with each region. For instance, in the non-limiting example, the techniques described herein can send a request for new data associated with the object feed and a request for new data associated with the recommended objects.

In a non-limiting example, new data associated with the object feed can identify that a new object should be added to the objects previously associated with the object feed. Additionally and/or alternatively, new data associated with the object feed can identify a new order of the objects associated with the object feed. Based at least in part on receiving the new data, techniques described herein can transition the content presented via the user interface so that a card associated with the new object is added to the first region of the user interface. Additionally, techniques described herein can write the new data to the cache in the location corresponding to the first region. In the at least one example, new data associated with the recommended objects may not identify any new objects to recommend to a user and/or a change in the order of the objects. Accordingly, the content associated with the second region in the user interface can persist and techniques described herein can refrain from writing any new data to the cache in the location corresponding to the second region.

In the non-limiting example, when the user subsequently requests access to the browser, techniques described herein can access cached data and can populate each region of the user interface associated with the browser with content based on the cached data stored in the location corresponding to the region, as described herein. That is, techniques described herein can populate the first region with cards corresponding to the data associated with the object feed, including the new card, and hyperlinks corresponding to the data associated with recommended objects in the second region. Then, the techniques described herein can asynchronously send requests for new data associated with each region, as described above. Accordingly, instead of waiting for each region to be populated with content corresponding to data that is current at the time of the request, the techniques described herein can cause the user interface to be presented with the same content in each region that was most recently presented to the user while techniques described herein fetch new data. This reduces the amount of time required to load the browser and enables the user to start interacting with the browser quickly after his or her request.

Illustrative Environments

FIG. 1 is an example environment 100 for leveraging a cache to reduce the amount of time required to present content via a browser responsive to content requests. More particularly, the example environment 100 can include a service provider 102, network(s) 104, a user 106, and a device 108 associated with the user 106.

The service provider 102 can be any entity, server(s), platform, etc., that facilitates presenting content via a user interface. In at least one example, the user interface can be associated with a browser corresponding to a web-based application that can aggregate content and/or data from multiple sources, as described above. In at least one example, the service provider 102 can include a cache for storing data associated with content most recently presented via the user interface. The service provider 102 can facilitate receiving a request for content, accessing data stored in the cache, and causing content corresponding to the data stored in the cache to be presented via the user interface. That is, in at least one example, responsive to a new request associated with a browser (e.g., a request to access the browser, a request to refresh the browser, a request to open a second browser associated with a same web-based application, etc.), the service provider 102 can facilitate presenting the most recently presented content in a same presentation that the content was most recently presented.

Furthermore, the service provider 102 can facilitate accessing updated data at a time subsequent to causing the content corresponding to the cached data to initially be presented via the user interface, and causing the content presented via the user interface to be modified based at least in part on the updated data. That is, after causing previously presented content to initially be presented responsive to a request associated with a browser, the service provider 102 can facilitate accessing new data that can correspond to new content and updating the content presented via the user interface, if appropriate. The service provider 102 can be implemented in a non-distributed computing environment or can be implemented in a distributed computing environment, possibly by running some modules on remotely located devices (e.g., device 108).

In at least one example, the service provider 102 can include one or more servers 110. The network(s) 104 can facilitate communication between the server(s) 110 and the device 108 associated with the user 106. The server(s) 110 and/or the device 108 can communicatively couple to the network(s) 104 in any manner, such as by a global or local wired or wireless connection (e.g., local area network (LAN), intranet, etc.). In some examples, the network(s) 104 can be any type of network known in the art, such as the Internet.

Examples support scenarios where device(s) that can be included in the one or more servers 110 can include one or more computing devices that operate in a cluster or other configuration to share resources, balance load, increase performance, provide fail-over support or redundancy, or for other purposes. Device(s) that can be included in the one or more servers 110 can include any type of computing device having processor(s) 112 operably connected to computer-readable media 114 such as via a bus, which in some instances can include one or more of a system bus, a data bus, an address bus, a PCI bus, a Mini-PCI bus, and any variety of local, peripheral, and/or independent buses. In at least one configuration, the computer-readable media 114 of the server(s) 110 can include module(s) for communicating with remote device(s) (e.g., device 108), determining data to send to the remote device(s) (e.g., device 108), and writing the data to a cache for storage and efficient recall. Alternatively, or in addition, the functionality described herein can be performed, at least in part, by one or more hardware logic components such as accelerators. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip Systems (SOCs), Complex Programmable Logic Devices (CPLDs), etc.

Device(s) that can be included in the one or more server(s) 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processor(s) 112 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In various examples, the processor(s) 112 can execute one or more modules and/or processes to cause the server(s) 110 to perform a variety of functions, as set forth above and explained in further detail in the following disclosure. Additionally, each of the processor(s) 112 can possess its own local memory, which also can store program modules, program data, and/or one or more operating systems.

As described above, in at least one configuration, the computer-readable media 114 of the server(s) 110 can include module(s) for communicating with remote device(s) (e.g., device 108), determining data to send to the remote device(s) (e.g., device 108), and writing the data to a cache for storage and efficient recall. The module(s) can represent pieces of code executing on a computing device. In some examples, a module can include an Application Program Interface (API) to perform some or all of its functionality (e.g., operations). In additional and/or alternative examples, the module(s) can be implemented as computer-readable instructions, various data structures, and so forth via at least one processing unit (e.g., processor(s) 112) to configure a device to execute instructions and to perform operations described herein. Functionality to perform these operations can be included in multiple devices or a single device. The module(s) can include a data transmission module 116 and a content determination module 118. Additionally, the computer-readable media 114 can include a cache 120.

The data transmission module 116 can receive data from remote devices (e.g., device 108) and can send data to remote devices (e.g., device 108). Additionally and/or alternatively, the data transmission module 116 can manage communications between the modules of the computer-readable media 114. Additional details associated with the data transmission module 116 are described below with reference to FIG. 2.

The content determination module 118 can access, receive, and/or determine data identifying content to be presented via the device 108. That is, in at least one example, the content determination module 118 can be a data source. The content determination module 118 can receive a query. In at least one example, the query can correspond to a request for data corresponding to content. In at least one example, the content determination module 118 can access data structure(s) to determine data that corresponds to the query. In some examples, a data structure can be a graph. In other examples, a data structure can be a matrix or any other data structure that can visually depict relationships between users and objects. The content determination module 118 can leverage the data structure(s) to determine data that corresponds to the query. Based at least in part on determining data that corresponds to the query, the content determination module 118 can generate a result. The result can include the data and the data can identify content that corresponds to the query. In additional and/or alternative examples, the content determination module 118 can access and/or receive data identifying content to be presented via the device 108 from other components or modules configured to determine such data.

Furthermore, the content determination module 118 can determine whether data associated with a result received responsive to a query is updated data, as described below with respect to FIG. 2. Moreover, based at least in part on determining that data associated with a result is updated data, the content determination module 118 can write the updated data to the cache 120.

The cache 120 comprises a component for storing data that can be efficiently accessed to quickly and easily enable content to be presented via a device 108. That is, in at least one example, the cache 120 can store data corresponding to content that was most recently presented via a user interface so that when a user 106 subsequently requests access to content associated with the user interface, the data can be fetched and corresponding content can be presented in near real time (e.g., one second, etc.). In at least one example, the cache 120 can be organized as a list. The list can include several list items. Each list item can be associated with data indicating a list item identifier, a key, a value, a hash code, a time stamp, a version, etc. In some examples, the key can correspond to the list item identifier.

As described above, each list item can be associated with data indicating a list item identifier. In some examples, a list item identifier can identify where in the list data associated with particular content can be located. Additionally and/or alternatively, a list item identifier can identify where a key, a value, a hash code, a version, a time stamp, etc. corresponding to the particular content can be located. In other examples, a list item identifier can identify where in the list new data associated with updated content can be written.

In at least one example, a key can correspond to a query name for a request for content. That is, a key can identify the content that is the subject of a query. In some examples, a key can correspond to a particular API endpoint. As described below with reference to FIG. 2, each query for updated data can be associated with a corresponding key. A value can correspond to data associated with a result received responsive to a query. In at least one example, the value can correspond to a JavaScript Object Notation (JSON) blob result corresponding to a JSON query. In other examples, the value can correspond to an XML result corresponding to a XML query, a binary compressed data result corresponding to a binary compressed data query, etc.

As a non-limiting example, a first list item can correspond to data associated with a collection of objects and a second list item can correspond to data associated with a collection of recently visited objects. The key for each list item can be the same as a query name for a corresponding query. For instance, if the content determination module 118 sends a query requesting data associated with a collection of objects, the key can be "objects/feeds." Alternatively, if the content determination module 118 sends a query requesting data associated with a collection of recent objects, the key can be "objects/recent." The value for each list item can be the result of a corresponding query, as described above.

A hash code can be associated with an indication identifying changes to the value. In at least one example, a hash code can identify a change associated with a result. That is, a hash code can identify that a result returned responsive to a query is different from a result returned responsive to a previous query associated with the same key. In a non-limiting example, the hash code can be a cyclic redundancy check (CRC) code in a C# syntax for important parts of the value. The important parts can correspond to parts that affect a presentation of the content. A time stamp can indicate a time that data associated with a list item is written to the cache 120. For the purpose of this discussion, the time stamp can reflect actual time (e.g., hour, minute, second, etc.) or relative time (e.g., one second ago, one minute ago, one week ago, etc.). A version can indicate a latest format version of the data associated with the result received responsive to a query (i.e., a latest version of the value).

In at least one example, the cache 120 can be stored in a partitioned region of storage, such as computer-readable media 114, to reduce processing required responsive to receiving requests from multiple users 106 at or near the same time. For instance, in some examples, the cache 120 can be stored on an entity-specific partitioned region of the storage corresponding to a site associated with an application that corresponds to the entity. As an example, the cache 120 can be stored on a user-specific partitioned region of the storage corresponding to a site associated with an application that corresponds to the user 106, such as the user partitioned region of storage described above. As an alternative example, the cache 120 can be stored on a group-specific partitioned region of the storage corresponding to a site associated with an application that corresponds to the group of users.

The cache 120 can be stored in a partitioned region of the storage to reduce concurrent loads on the server(s) 110. In at least one example, multiple partitioned regions can be distributed across various instances of the storage (e.g., across available databases), which can alleviate contention caused by concurrent requests and enable a uniform access pattern to the server(s) 110. In addition to reducing concurrent loads and/or alleviating contention, storing the cache 120 in a user partitioned region of the storage can provide additional security measures by limiting information disclosure outside of a particular user partitioned region. As described herein, in at least one example, the cache can store data corresponding to content that was most recently presented via a user interface associated with a device corresponding to a user in a user partitioned region of the storage. Because the data is stored in a user partitioned region of the storage, other users cannot access the data. As such, storing the cache 120 in a partitioned region of the storage can reduce the need for additional security and/or permissions filtering that can be required for globally cached data.

Depending on the exact configuration and type of the server(s) 110, computer-readable media 114, can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

As described above, user 106 can operate a device 108 (e.g., user device) to perform various functions associated with the device 108. The device 108 can represent a diverse variety of device types and is not limited to any particular type of device. Examples of device 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like.

In at least one example, device 108 can include processor(s) 122 and computer-readable media 124. In such examples, the processor(s) 122 can have a same composition and functionality as processor(s) 112, the computer-readable media 124 can have a same composition and functionality as computer-readable media 114. In at least one configuration, the computer-readable media 124 of the device can include module(s) for communicating with the service provider 102 and presenting content via the device 108. Alternatively, or in addition, the functionality described herein can be performed, at least in part, by one or more hardware logic components such as accelerators. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip Systems (SOCs), Complex Programmable Logic Devices (CPLDs), etc.

In examples where the computer-readable media 124 includes module(s), the module(s) can represent pieces of code executing on a computing device. In some examples, a module can include an Application Program Interface (API) to perform some or all of its functionality (e.g., operations). In additional and/or alternative examples, the module(s) can be implemented as computer-readable instructions, various data structures, and so forth via at least one processing unit (e.g., processor(s) 122) to configure a device to execute instructions and to perform operations described herein. Functionality to perform these operations can be included in multiple devices or a single device. The module(s) can include a communication module 126, a data management module 128, and a presentation module 130. Additionally, the computer-readable media 124 can include one or more applications 132.

The communication module 126 can send data to the service provider 102 and receive data from the service provider 102. Additionally and/or alternatively, the communication module 126 can manage communications between the modules of the computer-readable media 124. Additional details associated with the communication module 126 are described below with reference to FIG. 2.

The data management module 128 can access and/or receive data corresponding to content from the content determination module 118 (via the data transmission module 116 and communication module 126) and can process the data to determine whether there is data associated with the cache 120 and/or whether the data is valid. For illustrative purposes, data can be valid so long as the data does not indicate that the cache 120 is empty, the data is not outdated, and the data is not incompatible. That is, the data can be valid based at least in part on the data being associated with a time stamp that is within a predetermined period of time and being associated with a same version such that the data is compatible with previous versions of the data. Alternatively, the data can be invalid based at least in part on the data indicating that the cache 120 is empty, the data being associated with a time stamp that is outside of a predetermined period of time, and/or the data being associated with a version that is incompatible with previous versions of the data. Additionally and/or alternatively, data management module 128 can determine whether data associated with a result (i.e., newly fetched data) is updated data, as described below with respect to FIG. 2. Moreover, based at least in part on determining that data associated with a result is updated data, the data management module 128 can facilitate updating the content presented via the user interface based on the updated data. Additional details associated with the data management module 128 are described below with reference to FIG. 2.

While the data management module 128 is shown in FIG. 1 as being associated with computer-readable media 124, in at least one example, the data management module 128 can be associated with the service provider 102 instead of the device 108. That is, in at least one example, a module associated with the computer-readable media 114 can perform at least some of the operations described herein with respect to the data management module 128.

The presentation module 130 can determine how to present content via a user interface. In at least one example, the presentation module 130 can generate presentation data that can be used to determine a presentation of content via a user interface. In at least one example, the presentation data can include instructions for rendering the graphical representations of the content via a user interface. For instance, the instructions can describe the geometry, viewpoint, texture, lighting, shading, etc. associated with a graphical representation. In some examples, the presentation data can include instructions associated with transitions for updating content based at least in part on updated data. That is, the presentation module 130 can determine how to update content and/or modify the presentation of content based at least in part on updated data received after the presentation module 130 presented the content associated with previously cached data. Additional details associated with updating content and/or modifying the presentation of content are provided below with reference to FIGS. 3A-3D.

The application(s) 132 can be created by programmers to fulfill specific tasks and/or perform specific functionalities. For example, applications 132 can provide utility, entertainment, educational, and/or productivity functionalities to users 106 of devices 108. Applications 132 can be built into a device (e.g., telecommunication, text message, clock, camera, etc.) or can be customized (e.g., games, news, transportation schedules, online shopping, etc.). In at least one example, an application of the application(s) 132 can be a web-based application. In some examples, a web-based application can aggregate content and/or data from multiple sources and present the content via a corresponding browser. As a non-limiting example, a web-based application can correspond to a collaborative service application (i.e., an application facilitating a collaborative computing environment). Alternatively, as another non-limiting example, a web-based application can correspond to a social networking application. Additional and/or alternative web-based applications can be imagined.

As described above, the device 102 can include the input interface(s) 134 and output interface(s) 136. The input interface(s) 134 can enable input via a keyboard, keypad, mouse, microphone, touch sensor, touch screen, joystick, control buttons, scrolling buttons, cameras, or any other device suitable to generate a signal and/or data defining a user interaction with the device 102. The output interface(s) 136 can enable the device 108 to present a user interface via a display (e.g., touch screen, liquid crystal display (LCD), etc.). Additionally, and/or alternatively, the output interface(s) can enable the device 108 to output data via speakers or other output devices. FIG. 1 illustrates an example of an output interface 136 (i.e., a display) presenting an example of a user interface 138 associated with a browser, as described herein.

Figure 2:
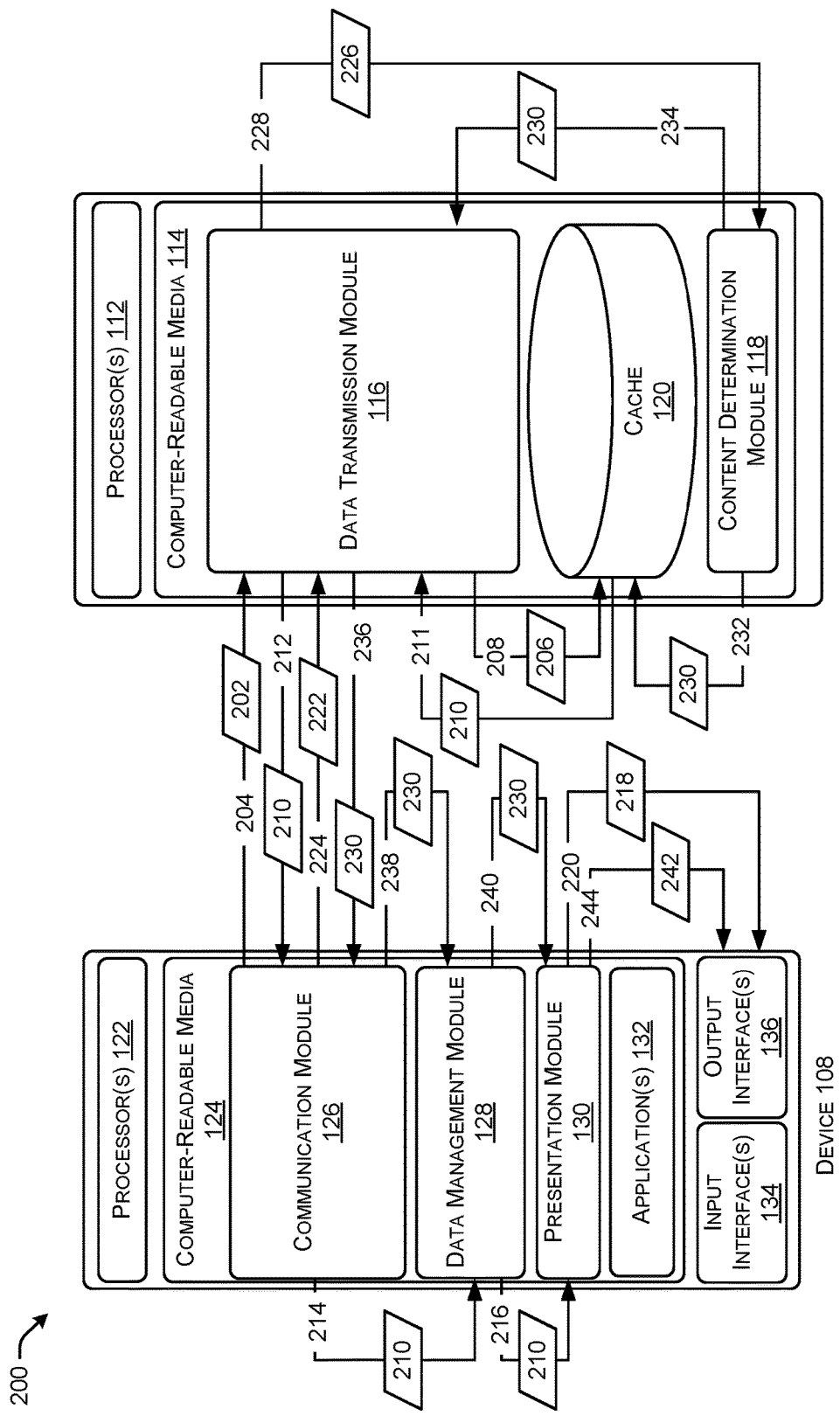
FIG. 2 is a schematic diagram showing an example data flow for leveraging a cache to reduce the amount of time required to present content responsive to a request for the content.

Turning to FIG. 2, FIG. 2 illustrates data flow through an example environment 200 for leveraging a cache 120 to reduce the amount of time required to present content responsive to content requests.

In at least one example, the communication module 126 can send a request 202 for content, as represented by line 204. In at least one example, a user 106 can interact with the device 108 via one or more input interface(s) 134 to request to open a browser associated with a web-based application, request to refresh the browser, or request to open a second browser associated with the web-based application. In some examples, a request to open a second browser can be associated with requesting to open a second browser on a same device 108 or a different device. Responsive to such request(s), the communication module 126 can send a request 202 for content to the service provider 102. In at least one example, the request 202 can be associated with a list item identifier identifying a list item stored in the cache 120 that corresponds to the content. In additional and/or alternative examples, the request 202 can be associated with data (e.g., a flag, etc.) indicating that the request 202 is for data stored in the cache 120 (i.e., cached data).

The data transmission module 116 can receive the request 202. Based at least in part on receiving the request 202, the data transmission module 116 can send a request 206 to access the cached data, as illustrated by line 208. As described above, the cache 120 can be organized as a list of items (i.e., list items). Each list item can be associated with a list item identifier that identifies its location in the list. Additionally, each list item can be associated with data identifying a key, a value, a hash code, a version, a time stamp, etc., as described above. In at least one example, the key can serve as a list item identifier.

The data transmission module 116 can access the cached data 210 stored in the cache 120, as represented by line 211, and can send the cached data 210 to the communication module 126, as represented by line 212. In at least one example, the cached data 210 can include the data identifying the key, the value, the hash code, the version, and the time stamp. The communication module 126 can receive the cached data 210 and can send the cached data 210 to the data management module 128 to determine whether the cached data 210 is valid, as represented by line 214. The data management module 128 can perform processing on the cached data 210.

In at least one example, the data management module 128 can access the cached data 210 and can perform processing on the cached data 210. For example, the data management module 128 can access the time stamp corresponding to the cached data 210. The data management module 128 can determine whether the cached data 210 is outdated (e.g., too old to be relevant) based at least in part on the time stamp.

Based at least in part on determining that the time stamp associated with a cached data 210 is within a predetermined period of time, the data management module 128 can determine that the cached data 210 is not outdated and is therefore valid. Additionally, the data management module 128 can process the cached data 210 to determine whether the version associated with the data is compatible with previously presented content. Based at least in part on determining that the version associated with the cached data 210 is compatible with the previously presented content, the data management module 128 can determine that the cached data 210 is valid. Accordingly, the data management module 128 can send the cached data 210 to the presentation module 130, as represented by line 216.

The presentation module 130 can generate presentation data 218 that can be used to determine a presentation of content corresponding to the cached data 210. In at least one example, the presentation data 218 can include instructions for rendering the graphical representations of the content associated with the cached data 210 via a user interface. For instance, the instructions can describe the geometry, viewpoint, texture, lighting, shading, etc. associated with individual graphical representations. The presentation module 130 can send the presentation data 218 to the output interface(s) 136, as represented by line 220. The output interface(s) 136 can leverage the presentation data 218 to output the content corresponding to the cached data 210 via a user interface.

At a time after the initial request 202 for the content, the communication module 126 can send a request 222 to access updates to the content that have occurred subsequent to the latest query and corresponding response, as represented by line 224. That is, the communication module 126 can asynchronously send requests (e.g., request 222) to the data transmission module 116. In at least some examples, the request 222 can include the hash code for the current cached data 210. The data transmission module 116 can send queries (e.g., query 226) corresponding to the requests to the content determination module 118, as represented by line 228, to access updates to the content that have occurred after the latest query and corresponding response. In at least one example, the query 226 can be associated with a list item identifier and/or a key. The content determination module 118 can receive the query 226 and can access, receive, and/or determine data identifying content that corresponds to the query 226.

In at least one example, the content determination module 118 can access data structure(s) to determine data identifying content that corresponds to a query 226, as described above. Based at least in part on determining the data identifying content that corresponds to the query 226, the content determination module 118 can generate a result 230. The result 230 can include data identifying content that corresponds to the query 226. The data can correspond to the value, as described above. Additionally, the content determination module 118 can associate a list item identifier, a key, a hash code, and/or a version with the result 230. The list item identifier can be the same list item identifier that was associated with the query 226. The key can be the same key that was associated with the query 226.

The content determination module 118 can perform processing on the data associated with the result 230. In at least one example, the content determination module 118 can compare the hash code associated with the corresponding cached data 210 with the hash code associated with the result 230. Based at least in part on determining that the hash codes are not the same, the content determination module 118 can determine that the data associated with the result 230 is updated data. Accordingly, the content determination module 118 can write the data associated with the result 230 to the cache 120 in a location corresponding to the list item identifier, as represented by line 232. As described above, in at least one example, the cache 120 can be associated with a particular entity (e.g., a user 106, a group, etc.) and can be stored in a partitioned region of storage, such as computer-readable media 114, corresponding to the particular entity (e.g., user partitioned region, group partitioned region, etc.). In such examples, the content determination module 118 can write the data associated with the result 230 to the cache 120 that is specific to the entity associated with the request 222. The data associated with the result 230 can be stored in the cache 120 with a time stamp indicative of the time that the data was written to the cache 120. That is, the key, the value, the hash code, and the version can be written to the cache 120 in a location corresponding to the list identifier. In at least one example, the data associated with the result 230 can replace any data previously stored in the same location (e.g., previously cached data).

Additionally, the content determination module 118 can send the result 230 to the data transmission module 116, as represented by line 234. In at least one example, the result 230 can include the newly fetched data and the corresponding hash code. The data transmission module 116 can send the result 230 to the communication module 126, as represented by line 236. The communication module 126 can send the result 230 to the data management module 128, as represented by line 238. In at least one example, the data management module 128 can compare the hash code associated with the corresponding cached data 210 with the hash code associated with the result 230. Based at least in part on determining that the hash codes are not the same, the data management module 128 can determine that the data associated with the result 230 is updated data. Accordingly, the data management module 128 can send the result 230 to the presentation module 130, as represented by line 240.

The presentation module 130 can generate presentation data 242 that can be used to determine a presentation of content corresponding to the data associated with the result 230. In at least one example, the presentation data 242 can include instructions for rendering the graphical representations of the data associated with the result 230 via the user interface. For instance, the instructions can describe the geometry, viewpoint, texture, lighting, shading, etc. associated with a graphical representation. Additionally, the presentation data 242 can include instructions for transitioning between content that is being presented based on previously cached data and the content corresponding to the data associated with the result 230. The presentation module 130 can send the presentation data 242 to the output interface(s) 136, as represented by line 244. The output interface(s) 136 can leverage the presentation data 242 to update the content corresponding to the cached data 210 based at least in part on the data associated with the result 230.

In at least one example, the data associated with the result 230 can be written and stored in the cache 120 in a same format as the data associated with the result 230 is sent to the device 108 via the data transmission module 116. Accordingly, when the data associated with the result 230 is subsequently requested, the communication module 126 can access the corresponding cached data and may not know that the data corresponds to cached data. The presentation module 130 can utilize the same presentation data for outputting the content whether the data is newly fetched data or cached data. That is, the presentation module 130 can use the same rendering logic for rendering the content whether the data is newly fetched data or cached data.

The example data flow illustrated in FIG. 2 is but one example and additional and/or alternative data flows are available. In at least one example, to generate a complete user interface, the example data flow illustrated in FIG. 2 can be repeated for content associated with different regions of the user interface. For instance, in a non-limiting example, a first request (e.g., request 202) can be associated with a request for content associated with objects in a feed that can be presented in a first region of a user interface, a second request (e.g., request 202) can be associated with a request for content associated with relevant objects (as determined from interactions between users and the objects) that can be presented in a second region of the user interface, a third request (e.g., request 202) can be associated with a request for content associated with recommended objects that can be presented in a third region of the user interface, a fourth request (e.g., request 202) can be associated with a request for content associated with recently accessed objects that can be presented in a fourth region of the user interface, etc. In such an example, the content associated with objects in a feed can be associated with a first list item (and corresponding list item identifier and/or key), content associated with relevant objects (as determined from interactions between users and the objects) can be associated with a second list item (and corresponding list item identifier and/or key), content associated with recommended objects can be associated with a third list item (and corresponding list item identifier and/or key), content associated with recently accessed objects can be associated with a fourth list item (and corresponding list item identifier and/or key), etc. As such, based at least in part on repeating the example data flow illustrated in FIG. 2 for content associated with different regions of the user interface, a complete user interface can be presented via the device 108.

Figure 3A:
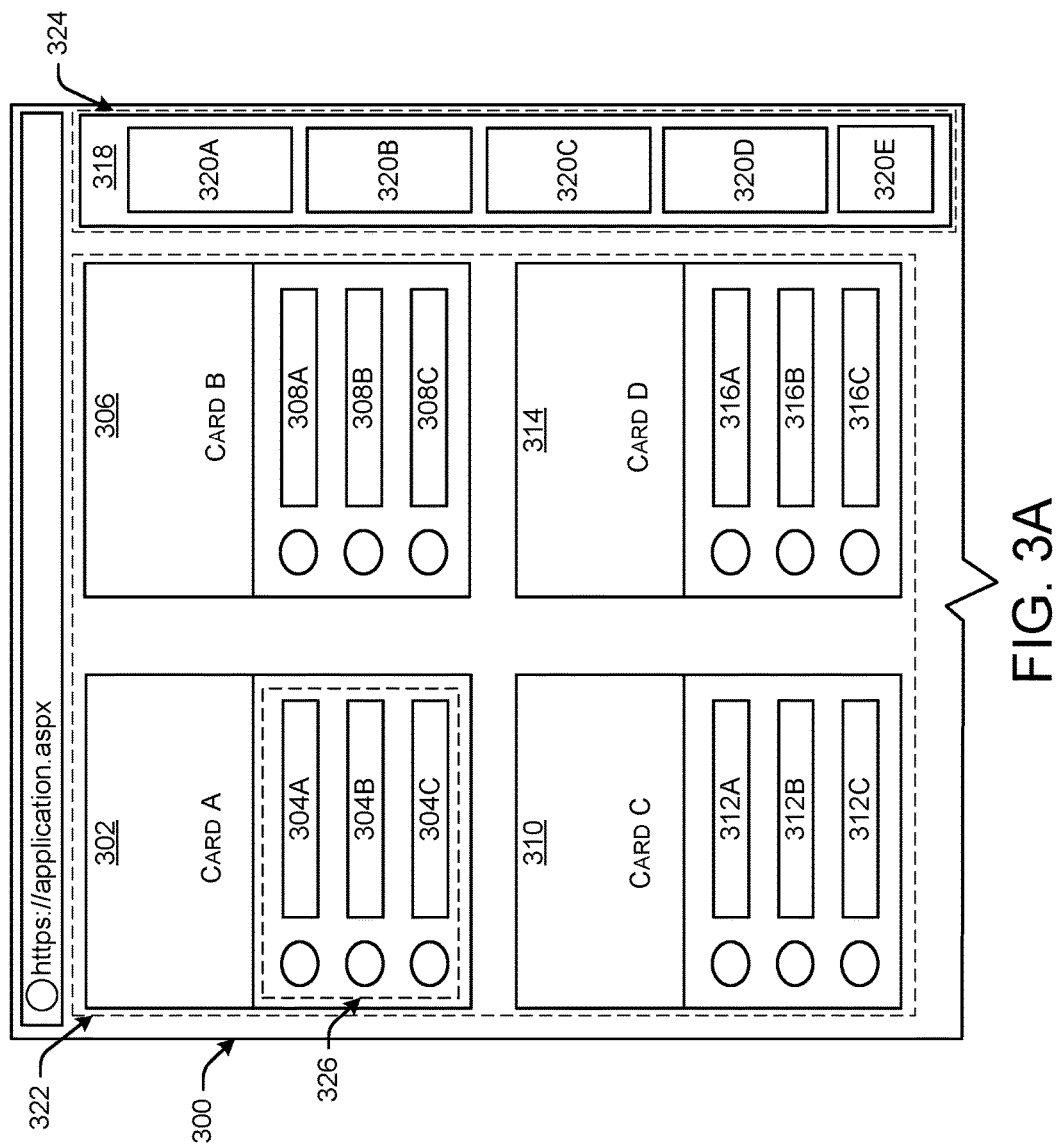
FIG. 3A is a schematic diagram showing an example of content presented via a user interface associated with a browser.

FIG. 3A illustrates an example user interface 300 associated with a browser. As illustrated, the user interface 300 can include a plurality of user interface (UI) elements. For instance, CARD A 302 corresponds to a UI element and CARD A 302 has three UI elements (e.g., 304A, 304B, 304C) that are associated with CARD A 302. Each of the UI elements can correspond to individual content items. In some examples, individual content items can be associated with different sources, as described above. For instance, CARD A 302 can correspond to a site, such as a group site. Each UI element (e.g., 304A, 304B, 304C) can correspond to a document shared between users associated with the group site. The documents can be associated with different devices, different applications, different service providers, etc. As illustrated in FIG. 3A, CARD B 306 is associated with three UI elements (e.g., 308A, 308B, 308C), CARD C 310 is associated with three UI elements (e.g., 312A, 312B, 312C), and CARD D 314 is associated with three UI elements (e.g., 316A, 316B, 316C). Any of the cards can have more or less than three UI elements and the examples provided with three UI elements are not to be construed as limiting. User interface 300 additionally includes a UI element that corresponds to a side bar 318. The side bar 318 includes a plurality of UI elements (e.g., 320A, 320B, 320C, 320D, 320E, etc.).

Content associated with user interface 300 can be associated with particular regions of the user interface 300. For instance, the UI elements that correspond to the cards (e.g., CARD A 302, CARD B 306, CARD C 308, and CARD D 310) can correspond to a first region 322 and the UI element that corresponds to the side bar 318 can correspond to a second region 324. In at least one example, UI elements that correspond to the UI elements on each card (e.g., 304A, 304B, 304C) can be associated with a third region 326. Content associated with each region (e.g., region 322, region 324, region 326, etc.) can be associated with different requests for data (i.e., different queries associated with different keys), as described above. For instance, a first request for content associated with region 322 can be associated with a first query for data identifying objects in a feed. Alternatively, a second request for content associated with region 324 can be associated with a second query for data identifying objects to recommend to a user 106. Or, a third request for content associated with region 326 can be associated with a third query for data identifying objects that are relevant to a user 106, as determined by interactions with the objects.

As described above, in at least one example, a user 106 can request access to a browser (e.g., web browser, mobile browser, etc.) associated with a web-based application. For instance, as described above, the user 106 can request to open the browser associated with the web-based application, request to refresh the browser, or request to open a second browser associated with the web-based application. As described above with reference to FIG. 2, when a user 106 requests access to a browser, the communication module 126 can send a request to the data transmission module 116 requesting data that is stored in the cache 120. The data transmission module 116 can return the data that is stored in the cache 112 and the presentation module 130 can facilitate the presentation of content corresponding to the data received from the data transmission module 116. User interface 300 is a non-limiting example of a user interface that can be presented via a browser based at least in part on cached data. As described herein, user interface 300 can present the same content that was most recently presented via the user interface 300. As described above, the content can also be presented in a same presentation as the content was most recently presented via the user interface 300.

As described above with reference to FIG. 2, while user interface 300 is presented via an output interface 136 of the device 108, the communication module 126 can send a request for updated data. Responsive to receiving updated data, the presentation module 130 can modify content presented via the user interface 300 to present new content. In some examples, the presentation module 130 can batch updated data and refrain from updating content presented via the user interface 300 until an occurrence of a triggering event. In at least one example, a triggering event can correspond to an interaction by a user 106 that prompts the content presented via the user interface 300 to be updated. Or, a triggering event can correspond to a determination that the user 106 changes a focus of an interaction with the user interface 300 to a new region. Alternatively, in at least one example, the presentation module 130 can modify content presented via the user interface 300 at substantially the same time that the updated data is received.

FIG. 3B illustrates user interface 300, with an indication of an interaction with the user interface (e.g., cursor 328). In FIG. 3B, updated data may have been received by the communication module 126 and the presentation module 130. In at least one example, the presentation module 130 can leverage input from an input interface 134 to determine a region in the user interface 300 that is the subject of a current interaction. For example, in FIG. 3B, region 322 can be determined to be the subject of a current interaction based on the location of the cursor 328. In at least one example, region 222 can be the region of the user interface 300 that warrants updates based on updated data. However, to avoid disrupting the user 106, the presentation module 130 can refrain from making updates until region 222 is not the region associated with the current interaction.

FIG. 3C illustrates a new user interface 330 associated with the browser. As illustrated in FIG. 3C, the cursor 328 is positioned in a region of the user interface 330 that corresponds to region 324. The presentation module 130 can determine that the cursor 328 is no longer positioned in region 322, and based at least in part on determining that the cursor 328 is no longer positioned in region 322, the presentation module 130 can facilitate updates to user interface 300. Such a determination can constitute a triggering event, as described above.

In at least one example, the presentation module 130 can utilize one or more transitions to move UI elements corresponding to updated data into view and to move previously presented UI elements out of view. Examples of the one or more transitions include, but are not limited to, scaling, fading, flipping, dropping, flying, swinging, etc. Additionally and/or alternatively, the presentation module 130 can utilize one or more animations to identify a new UI element. Examples of animations include, but are not limited to, a jiggle animation, a flash animation, a shake animation, a pulse animation, a bounce animation, etc.

Various updates are shown in user interface 330. In user interface 330, CARD B 306 is positioned where CARD C 310 was previously positioned in user interface 300 and CARD C 310 is positioned where CARD B 306 was previously positioned in user interface 300. Additionally, CARD E 332 is a new card that was not previously presented in user interface 300. Moreover, UI element 304B has been replaced with UI element 304E. Further, UI element 312D is a new UI element that caused UI element 312A and UI element 312B to be moved down the list.

In an example where the updates to the user interface 300 are batched until the occurrence of a triggering event, all of the updates can occur at substantially the same time. In additional and/or alternative examples, the updates to the user interface can occur as the updated data is received. As a non-limiting example, a UI element corresponding to a new card can fade into the user interface into a region of the user interface that is not associated with another UI element. Alternatively, if a UI element associated with a new card (e.g., CARD E 332) is replacing a UI element associated with a previously presented card (e.g., CARD D 314), the UI element corresponding to the new card can fade into the user interface at a substantially same time as the UI element associated with the previously presented card fades out of the user interface. Or, alternatively, if a new UI element (e.g., UI element 304E) is replacing a UI element previously presented via a same card (e.g., UI element 304B), the new UI element can fade into the user interface at a substantially same time as the UI element associated with the previously presented card fades out of the user interface. Moreover, a new UI element (e.g., UI element 312D) can be added to a card. In some examples, the new UI element can cause a shift in the order that the UI elements are presented on the card. In such examples, the previously presented UI elements (e.g., UI element 312A, UI element 312B) can appear to be bumped down the list of UI elements.

FIG. 3A-3C illustrate but one example of user interfaces 300 and 330 that can be presented via a browser. Additional and/or alternative content can be presented via various user interfaces. Additionally, additional and/or alternative configurations of content can be presented via various user interfaces.

Example Processes

The processes described in FIGS. 4 and 5 below are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
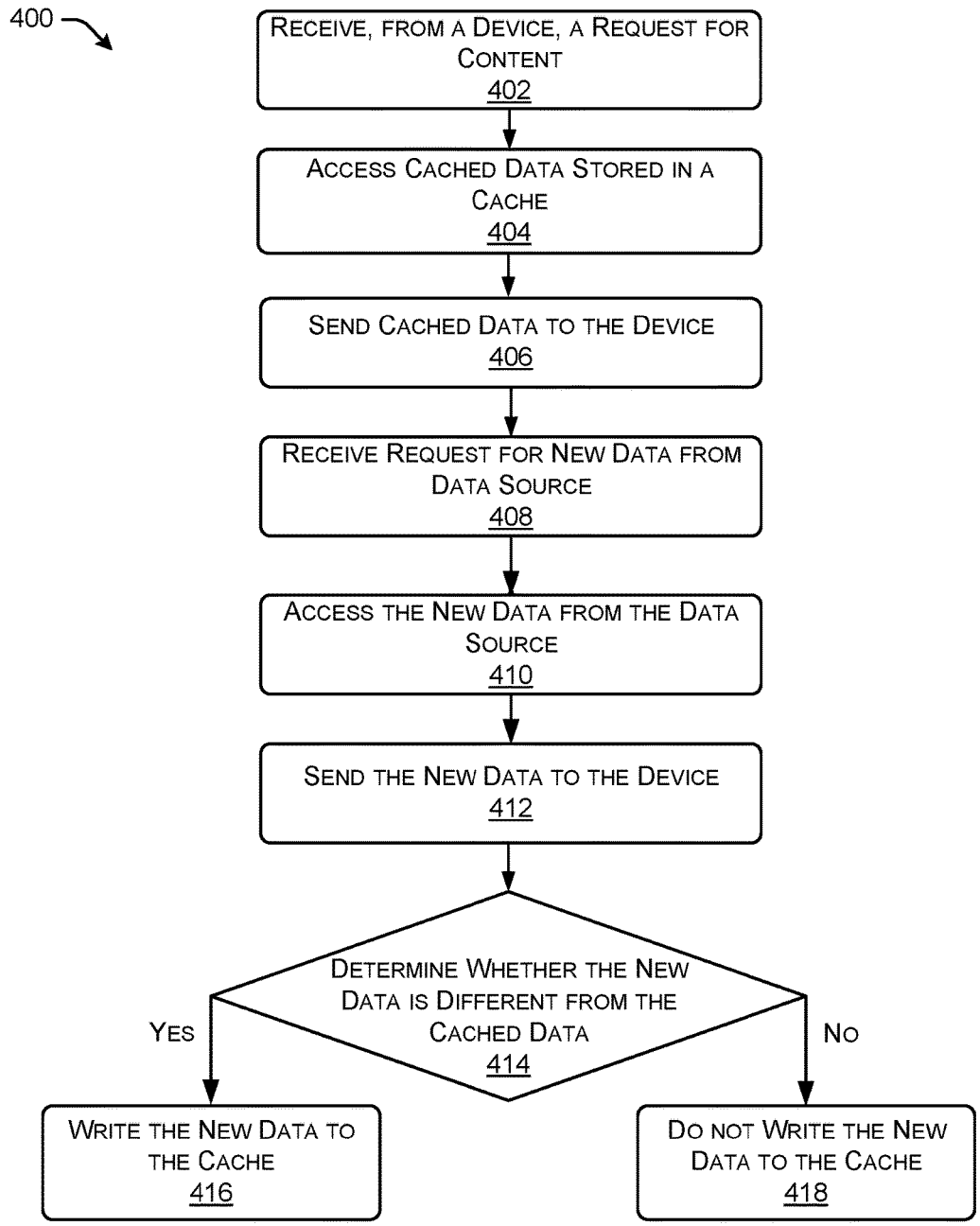
FIG. 4 is a flow diagram that illustrates an example process to leverage a cache to reduce the amount of time required to present content responsive to a request for the content.

FIG. 4 illustrates an example process 400 to leverage a cache 120 to reduce the amount of time required to present content responsive to a request for the content.

Block 402 illustrates receiving, from a device 108, a request for content (i.e., a content request). As described above, the communication module 126 can send a request for content to the service provider 102. In at least one example, a user 106 can interact with the device 108 via one or more input interface(s) 134 to request to open a browser associated with a web-based application, request to refresh the browser, or request to open a second browser associated with the web-based application. Responsive to such request(s), the communication module 126 can send a content request for content associated with a browser to the service provider 102. In at least one example, the content request can be associated with a list item identifier identifying a list item stored in the cache 120 that corresponds to the content. In additional and/or alternative examples, the content request can be associated with data (e.g., a flag, etc.) indicating that the request is for data stored in the cache 120 (i.e., cached data).

Block 404 illustrates accessing cached data stored in a cache 120. The data transmission module 116 can receive the content request. Based at least in part on receiving the content request, the data transmission module 116 can send a request to access the cached data. The data transmission module 116 can receive and/or access the cached data in the cache 120. As described above, in at least one example, the cached data may associated with a partitioned region of storage associated with the service provider 102. In at least one example, the partitioned region of the storage can be a user partitioned region of the storage, so that the particular storage partition is a function of a user that is exclusively accessible to that user. Accordingly, in at least one example, the data transmission module 116 can receive and/or access cached data from the user partitioned region of the storage that corresponds to the user 106.

Block 406 illustrates sending the cached data to the device 108. The data transmission module 116 can send the cached data to the communication module 126. The communication module 126 can receive the cached data and can send the cached data to the data management module 128 to determine whether the cached data is valid. Based at least in part on determining the cached data is valid, the data management module 128 can send the cached data to the presentation module 130. The presentation module 130 can generate presentation data that can be used to determine a presentation of content corresponding to the cached data, as described above. The presentation module 130 can send the presentation data to the output interface(s) 136. The output interface(s) 136 can leverage the presentation data to output the content corresponding to the cached data via a user interface.

Block 408 illustrates receiving a request for new data from a data source (e.g., the content determination module 118). At a time after the initial request for content, the communication module 116 can send a request for updated data. In at least one example, the request can be associated with the hash code corresponding to the cached data. The data transmission module 116 can receive the request and send a query to access updates to the content that have occurred subsequent to the latest query and corresponding response. That is, the data transmission module 116 can asynchronously send queries to the content determination module 118 to access updates to the content that have occurred after the latest query and corresponding response. In at least one example, the query can be associated with the key. The content determination module 118 can receive the query and can access, receive, and/or determine data identifying content that corresponds to the query, as described above. Based at least in part on determining content that corresponds to the query, the content determination module 118 can generate a result. The result can include data identifying content that corresponds to the query. The data can correspond to the value, as described above. Additionally, the content determination module 118 can associate a list item identifier, a key, a hash code, and/or a version with the result.

Block 410 illustrates accessing the new data from the data source (e.g., the content determination module 118). The data transmission module 116 can receive data associated with the result, as described above. In at least one example, the result can be associated with a hash code, as described above.

Block 412 illustrates sending the new data to the device 108. The data transmission module 116 can receive the result and send the result to the device 108. The data transmission module 116 can send the result to the communication module 126. The communication module 126 can send the result to the data management module 128. In at least one example, the data management module 128 can compare the hash code associated with the corresponding cached data with the hash code associated with the result. Based at least in part on determining that the hash codes are not the same, the data management module 128 can determine that the data associated with the result is updated data. Accordingly, the data management module 128 can send the result to the presentation module 130 and can cause the content presented via the user interface to be updated based at least in part on the updated data. However, based at least in part on determining that the hash codes are the same, the data management module 128 can determine that the data associated with the result is not updated data and the content presented via the user interface can remain unchanged.

Block 414 illustrates determining whether the new data is different from the cached data. As described above, the content determination module 118 can perform processing on the data associated with the result. In at least one example, the content determination module 118 can compare the hash code associated with the corresponding cached data with the hash code associated with the result. Based at least in part on determining that the hash codes are not the same, the content determination module 118 can determine that the data associated with the result is updated data. Based at least in part on determining that the data associated with the result is updated data, the content determination module 118 can write the data associated with the result (i.e., the new data) to the cache 120 in a location corresponding to the list item identifier, as illustrated in block 416. Based at least in part on determining that the hash codes are the same, the content determination module 118 can determine that the data associated with the result (i.e., the new data) is not updated data. Accordingly, the content determination module 118 can refrain from writing the data associated with the result to the cache 120, as illustrated in block 418.

Figure 5:
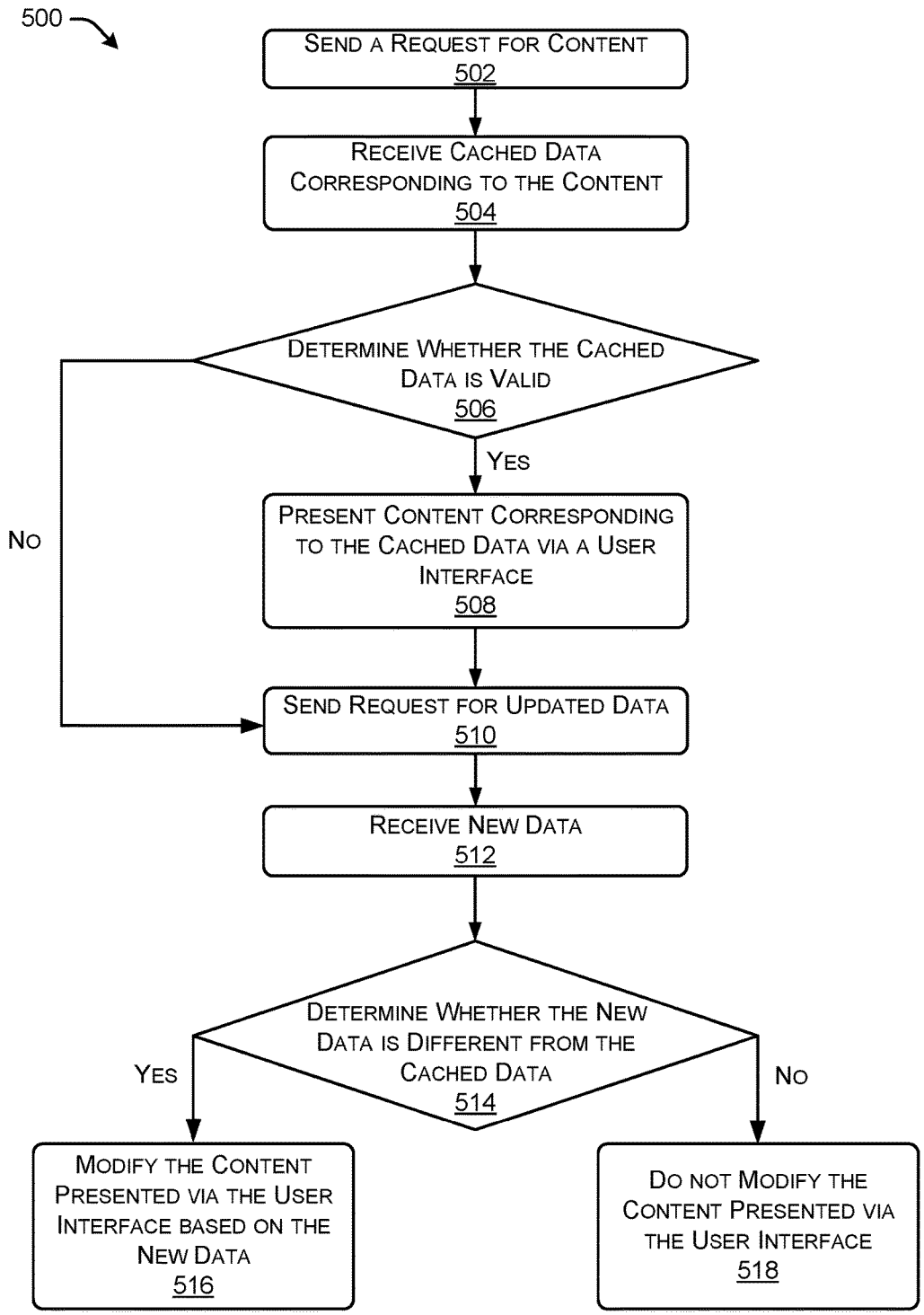
FIG. 5 is a flow diagram that illustrates an example process to present content responsive to a request for the content.

FIG. 5 illustrates an example process 500 to present content responsive to a request for the content.

Block 502 illustrates sending a request for content (i.e., a content request). As described above, the communication module 126 can send a request for content to the service provider 102. In at least one example, the request can be associated with a list item identifier identifying a list item stored in the cache 120 that corresponds to the content. In additional and/or alternative examples, the request can be associated with data (e.g., a flag, etc.) indicating that the request is for data stored in the cache 120 (i.e., cached data).

Block 504 illustrates receiving cached data corresponding to the content. As described above, the data transmission module 116 can access data corresponding to the content request that is stored in the cache 120 (e.g., cached data). The data transmission module 116 can send the cached data to the communication module 126. In at least one example, the cached data can include data identifying the key, the value, the hash code, the time stamp, and the version associated with the cached data.

Block 506 illustrates determining whether the cached data is valid. The communication module 126 can receive the cached data and can send the cached data to the data management module 128 to perform processing on the cached data. The data management module 128 can perform processing on the cached data to determine whether the cached data is valid.

In some examples, the cached data can be empty. In such examples, responsive to receiving the cached data, the data management module 128 can determine that the cached data is empty. Based at least in part on receiving a response indicating that there is no data stored in the cache 120 that corresponds to the request, the data transmission module 116 can determine that the cached data is not valid. In such examples, the data management module 128 can send a request to a data source (e.g., content determination module 118) for data that corresponds to the content request (as illustrated in block 510).

Additionally, the data management module 128 can access the time stamp corresponding to the cached data. The data management module 128 can determine whether the cached data is outdated (e.g., too old to be relevant) based at least in part on the time stamp. In at least one example, the data management module 128 can determine that the time stamp associated with the cached data is outside of a predetermined period of time. Accordingly, the data management module 128 can determine that the cached data is outdated and not valid. In such examples, the data management module 128 can send a request to a data source (e.g., content determination module 118) for data that corresponds to the content request (as illustrated in block 510). Based at least in part on determining that the time stamp associated with a cached data is within a predetermined period of time, the data management module 128 can determine that the cached data is not outdated and is therefore valid.

Moreover, the data management module 128 can process the cached data to determine whether the version associated with the cached data is compatible with previously presented content. In at least one example, the data management module 128 can determine that the version associated with the cached data is compatible with the previously presented content. Accordingly, the data management module 128 can determine that the cached data is not valid. In such examples, the data management module 128 can send a request to a data source (e.g., content determination module 118) for data that corresponds to the content request (as illustrated in block 510). Based at least in part on determining that the version associated with the cached data is compatible with the previously presented content, the data management module 128 can determine that the cached data is valid.

Block 508 illustrates presenting content corresponding to the cached data via a user interface. Based at least in part on determining that the cached data is valid, the communication module 126 can send the cached data to the presentation module 130. The presentation module 130 can generate presentation data that can be used to determine a presentation of content corresponding to the data, as described above. The presentation module 130 can send the presentation data to the output interface(s) 136. The output interface(s) 136 can leverage the presentation data to output the content corresponding to the data via a user interface associated with the browser.

Block 510 illustrates requesting updated data associated with the content request. In at least one example, regardless of whether the cached data is valid or not valid, the communication module 126 can send a request, via the data transmission module 116, to a data source (e.g., content determination module 118) for data that corresponds to the content request. In at least one example, the request can include the hash code associated with the cached data if cached data is available. As described above, the data transmission module 116 can asynchronously send queries to the content determination module 118 to access updates to the content that have occurred after the latest query and corresponding response. The content determination module 118 can receive the query and can access, receive, and/or determine data identifying content that corresponds to the query, as described above. Based at least in part on determining content that corresponds to the query, the content determination module 118 can generate a result. The result can include data identifying content that corresponds to the query. In at least one example, the result can include data identifying the key, the value, the hash code, the time stamp, and the version associated with the result.

Block 512 illustrates receiving new data from the data source (e.g., the content determination module 118). The content determination module 118 can determine data corresponding to the content request and can determine a result, as described above. The content determination module 118 can send new data associated with the result to the data transmission module 116. The data transmission module 116 can send the new data associated with the result to the device 108.

Block 514 illustrates determining whether the new data is different from the cached data. As described above, the data management module 128 can perform processing on the new data associated with the result. In at least one example, the data management module 128 can compare the hash code associated with the corresponding cached data with the hash code associated with the result. Based at least in part on determining that the hash codes are not the same, the data management module 128 can determine that the data associated with the result is updated data. Based at least in part on determining that the data associated with the result (i.e., new data) is updated data, the data management module 128 can modify the content presented via the user interface based on the new data, as illustrated in block 516 and described above. Based at least in part on determining that the hash codes are the same, the data management module 128 can determine that the data associated with the result (i.e., new data) is not updated data. Accordingly, the data management module 128 can refrain from modifying the content presented via the user interface based on the new data, as illustrated in block 518 and described above.

Example Clauses

A. A system comprising: a cache storing a plurality of list items, a list item of the plurality of list items corresponding to content associated with a region of a plurality of regions of a user interface presented via a device; one or more processors; and memory that stores one or more modules that are executable by the one or more processors to cause the system to perform operations comprising: receiving a request for the content; accessing, from the cache, data associated with the list item; causing, based at least in part on the data, the content corresponding to the list item to be presented in the region of the user interface via a presentation that is a same presentation as a most recent presentation of the content; accessing, at a time subsequent to when the content is initially presented in the region, new data associated with the list item; determining that the new data corresponds to updated data associated with the list item; causing the presentation to be modified based at least in part on the updated data; and writing the new data to the cache in a location corresponding to the list item.

B. A system as paragraph A recites, wherein the cache is associated with a partitioned region of the memory that corresponds to a user associated with the request.

C. A system as paragraph A or B recites, wherein the list item is associated with at least one of a key, a value, a hash code, a time stamp, or a version.

D. A system as any of paragraphs A-C recite, wherein receiving the request for the content is based at least in part on receiving a request to open a browser associated with the user interface, receiving a request to refresh the browser, or receiving a request to open a second browser associated with a same application as the browser.

E. A system as any of paragraphs A-D recite, wherein causing the presentation to be modified comprises causing a previously presented content item to be replaced with a new content item in the region.

F. A system as any of paragraphs A-E recite, wherein causing the presentation to be modified comprises causing at least some content items in the region to be re-arranged.

G. A system as any of paragraphs A-F recite, further comprising an interface for receiving the new data from a data source and sending the new data to the device.

H. A system as any of paragraphs A-G recite, further comprising an interface for receiving the new data from a data source and writing the new data to the cache.

I. A device comprising: a display for presenting a user interface, the user interface including a plurality of regions that are each associated with a plurality of content sources; one or more processors; and memory that stores one or more modules that are executable by the one or more processors to cause the device to perform operations comprising: sending a request for content to be presented via a first region of the plurality of regions; receiving a plurality of data items, a plurality of content items respectively corresponding to the plurality of data items having been most recently presented via the user interface; presenting, via the user interface, the plurality of content items in a presentation that is a same presentation as a most recent presentation of the plurality of content items; receiving, at a time after the plurality of content items are initially presented via the user interface, updated data; and modifying the presentation based at least in part on the updated data.

J. A device as paragraph I recites, the operations further comprising, based at least in part on presenting the plurality of content items, asynchronously sending a request for the updated data.

K. A device as either paragraph I or J recites, the operations further comprising: accessing a time stamp associated with the plurality of data items; and determining that the time stamp is associated with a time that is within predetermined period of time.

L. A device as any of paragraphs I-K recite, wherein: the plurality of data items are associated with a version; and the operations further comprise determining that the version is compatible with the most recent presentation.

M. A device as any of paragraphs I-L recite, wherein, for a data item of the plurality of data items, the operations further comprise: accessing a first hash code associated with the data item; accessing a second hash code associated with a corresponding updated data item of the updated data; determining that the first hash code and the second hash code are different; and modifying the presentation based at least in part on the updated data item.

N. A device as any of paragraphs I-M recite, the operations further comprising: based at least in part on receiving the updated data, batching the updated data; and modifying the presentation based at least in part on a triggering event.

O. A device as paragraph N recites, the operations further comprising: detecting an interaction in a second region of the plurality of regions, the second region being different from the first region; and determining a triggering event based at least in part on the interaction.

P. A device as any of paragraphs I-O recite, wherein modifying the presentation comprises: modifying the presentation in the first region of the user interface; and causing the presentation in other regions of the plurality of regions to persist.

Q. A device as any of paragraphs I-P recite, the operations further comprising presenting the plurality of content items utilizing a same rendering logic that was used for previously presenting the plurality of content items.

R. A method for reducing processing required to fetch and return content that is presented via a user interface of a device associated with a user, the method comprising: receiving a request for a browser associated with a web-based application, the browser configured to present the user interface; accessing, from a cache that is stored in a user partitioned region of storage associated with a server that is specific to the user, a plurality of first data items respectively corresponding to a plurality of content items having been most recently presented via the browser; causing the plurality of content items to be presented via the user interface via a same presentation as a most recent presentation of the plurality of content items; accessing a plurality of second data items; sending the plurality of second data items to the device; determining a second data item of the plurality of second data items is associated with new data; and writing the second data item to the cache.

S. A method as paragraph R recites, wherein determining that the second data item is associated with new data comprises: accessing a first hash code corresponding to a first data item of the plurality of first data items; accessing a second hash code corresponding to the second data item, the first data item and the second data item being associated with a same key; comparing the first hash code and the second hash code; and determining that the first hash code and the second hash code do not match.

T. A method as either paragraph R or S recites, further comprising: sending the second data item to the device in a format; and writing the second data item to the cache in the format.

U. A method as any of paragraphs R-T recite, further comprising, prior to accessing a plurality of second data items, asynchronously receiving a request for updated data.

V. One or more computer-readable media encoded with instructions that, when executed by a processor, configure a computer to perform a method as any of paragraphs R-U recite.

W. A device comprising one or more processors and one or more computer readable media encoded with instructions that, when executed by the one or more processors, configure a computer to perform a computer-implemented method as any of paragraphs R-U recite.

X. A method for reducing processing required to fetch and return content that is presented via a user interface of a device associated with a user, the method comprising: means for receiving a request for a browser associated with a web-based application, the browser configured to present the user interface; means for accessing, from a cache that is stored in a user partitioned region of storage associated with a server that is specific to the user, a plurality of first data items respectively corresponding to a plurality of content items having been most recently presented via the browser; means for causing the plurality of content items to be presented via the user interface via a same presentation as a most recent presentation of the plurality of content items; means for accessing a plurality of second data items; means for sending the plurality of second data items to the device; means for determining a second data item of the plurality of second data items is associated with new data; and means for writing the second data item to the cache.

Y. A method as paragraph X recites, wherein determining that the second data item is associated with new data comprises: means for accessing a first hash code corresponding to a first data item of the plurality of first data items; means for accessing a second hash code corresponding to the second data item, the first data item and the second data item being associated with a same key; means for comparing the first hash code and the second hash code; and means for determining that the first hash code and the second hash code do not match.

Z. A method as either paragraph X or Y recites, further comprising: means for sending the second data item to the device in a format; and means for writing the second data item to the cache in the format.

AA. A method as any of paragraphs X-Z recite, further comprising means for, prior to accessing a plurality of second data items, asynchronously receiving a request for updated data.

CONCLUSION

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A system comprising:
   a cache storing a plurality of list items, a list item of the plurality of list items corresponding to content associated with a region of a plurality of regions of a user interface presented via a device;
   one or more processors; and
   memory that stores one or more instructions that are executable by the one or more processors to cause the system to perform operations comprising:
      receiving a first request to access a browser, the first request comprising an initial request for the content associated with a first region of the plurality of regions, the initial request identifying the first region;
      accessing, from the cache, data associated with the list item corresponding to the content associated with the first region;
      causing, based at least in part on the data, the content corresponding to the list item to be presented in the first region of the user interface via a presentation that is a same presentation as a most recent presentation of the content;
      receiving a second request to access the browser, the second request comprising a subsequent request for the content associated with the first region, the subsequent request comprising a first list item identifier for the data associated with the list item from the cache;
      in response to the second request, accessing the data associated with the list item from the cache and presenting the content corresponding to the list item in the first region of the user interface, based at least in part on the data;
      accessing, at a time subsequent to when the content is initially presented in the first region and in response to receiving the second request, new data associated with the list item and a corresponding second list item identifier;
      determining that the new data corresponds to updated data associated with the list item based on a comparison of the first list item identifier with the second list item identifier;
      causing the presentation to be modified based at least in part on the updated data; and
      writing the new data to the cache in a location corresponding to the list item and the second list item identifier.

2. A system as claim 1 recites, wherein the cache is associated with a partitioned region of the memory that corresponds to a user associated with the initial request.

3. A system as claim 1 recites, wherein the list item is associated with at least one of a key, a value, a hash code, a time stamp, or a version.

4. A system as claim 1 recites, wherein receiving the subsequent request for the content is based at least in part on receiving a request to open a browser associated with the user interface, receiving a request to refresh the browser, or receiving a request to open a second browser associated with a same application as the browser.

5. A system as claim 1 recites, wherein causing the presentation to be modified comprises causing a previously presented content item to be replaced with a new content item in the first region.

6. A system as claim 1 recites, wherein causing the presentation to be modified comprises causing at least some content items in the first region to be re-arranged.

7. A system as claim 1 recites, further comprising an interface for receiving the new data from a data source and sending the new data to the device.

8. A system as claim 1 recites, further comprising an interface for receiving the new data from a data source and writing the new data to the cache.

9. A device comprising:
   a display for presenting a user interface, the user interface including a plurality of regions that are each associated with a plurality of content sources;
   one or more processors; and
   memory that stores one or more instructions that are executable by the one or more processors to cause the device to perform operations comprising:
      sending a first request to access a browser, the first request comprising an initial request for content to be presented via a first region of the plurality of regions, the initial request identifying the first region;
      receiving a plurality of data items for the first region, a plurality of content items respectively corresponding to the plurality of data items having been most recently presented via the user interface;
      presenting, in the first region of the user interface, the plurality of content items in a presentation that is a same presentation as a most recent presentation of the plurality of content items;
      sending a second request to access the browser, the second request comprising a subsequent request for the content associated with the first region, the subsequent request comprising a first list item identifier for the data associated with the list item from a cache;
      in response to the second request, presenting the content corresponding to the list item in the first region of the user interface, based at least in part on the data;
      receiving, at a time after the plurality of content items are initially presented via the user interface, updated data in response to the second request; and
      modifying the presentation based at least in part on the updated data.

10. A device as claim 9 recites, the operations further comprising, based at least in part on presenting the plurality of content items, asynchronously sending a request for the updated data.

11. A device as claim 9 recites, the operations further comprising:
   accessing a time stamp associated with the plurality of data items; and
   determining that the time stamp is associated with a time that is within predetermined period of time.

12. A device as claim 9 recites, wherein:
   the plurality of data items are associated with a version; and
   the operations further comprise determining that the version is compatible with the most recent presentation.

13. A device as claim 9 recites, wherein, for a data item of the plurality of data items, the operations further comprise:
   accessing a first hash code associated with the data item;
   accessing a second hash code associated with a corresponding updated data item of the updated data;
   determining that the first hash code and the second hash code are different; and
   modifying the presentation based at least in part on the updated data item.

14. A device as claim 9 recites, the operations further comprising:
   based at least in part on receiving the updated data, batching the updated data; and
   modifying the presentation based at least in part on a triggering event.

15. A device as claim 14 recites, the operations further comprising:
   detecting an interaction in a second region of the plurality of regions based on a location of a user-controlled visual indicator indicating the user-controlled visual indicator being in the second region, the second region being different from the first region; and
   determining a triggering event based at least in part on the interaction.

16. A device as claim 9 recites, wherein modifying the presentation comprises:
   modifying the presentation in the first region of the user interface; and
   causing the presentation in other regions of the plurality of regions to persist.

17. A device as claim 9 recites, the operations further comprising presenting the plurality of content items utilizing a same rendering logic that was used for previously presenting the plurality of content items.

18. A method for reducing processing required to fetch and return content that is presented via a user interface of a device associated with a user, the method comprising:
   receiving a first request to access a browser, the first request comprising an initial request for a browser associated with a web-based application, the browser configured to present the user interface;
   accessing, from a cache that is stored in a user partitioned region of storage associated with a server that is specific to the user, a plurality of first data items respectively corresponding to a plurality of content items having been most recently presented via the browser;
   causing the plurality of content items to be presented via the user interface via a same presentation as a most recent presentation of the plurality of content items;
   receiving a second request to access the browser, the second request comprising a subsequent request for the content associated with a first region of a plurality of regions of browser, the subsequent request comprising a first list item identifier for the data associated with the list item from the cache;
   in response to the second request, accessing the data associated with the list item from the cache and presenting the content corresponding to the list item in the first region of the user interface, based at least in part on the data;
   in response to the second request, accessing a plurality of second data items associated with the first region of the plurality of regions of browser;

sending the plurality of second data items to the device;
determining a second data item of the plurality of second data items is associated with new data based on a comparison of the first list item identifier with a second list item identifier corresponding to the second data item; and
writing the second data item to the cache.

19. A method as claim 18 recites, wherein determining that the second data item is associated with new data comprises:
accessing a first hash code corresponding to a first data item of the plurality of first data items;
accessing a second hash code corresponding to the second data item, the first data item and the second data item being associated with a same key;
comparing the first hash code and the second hash code; and
determining that the first hash code and the second hash code do not match.

20. A method as claim 18 recites, further comprising:
sending the second data item to the device in a format; and
writing the second data item to the cache in the format.

* * * * *